United States Patent [19]

Chung et al.

[11] Patent Number: 4,807,213
[45] Date of Patent: Feb. 21, 1989

[54] LASER DRUM FOR USE IN RECORDING AND REPRODUCING INFORMATION ON OPTICAL TAPES

[75] Inventors: Seung T. Chung, Seoul; Hae W. Kwon; Tae S. Park, both of Kyungki, all of Rep. of Korea

[73] Assignee: Samsung Electronics Co., Ltd., Kyungki, Rep. of Korea

[21] Appl. No.: 17,583

[22] Filed: Feb. 24, 1987

[30] Foreign Application Priority Data

Feb. 28, 1986 [KR] Rep. of Korea ................... 1986-1430

[51] Int. Cl.$^4$ ............................ G11B 7/09; G11B 7/12
[52] U.S. Cl. ..................................... 369/46; 346/108; 369/44; 369/106; 369/111; 369/116; 369/122; 369/97
[58] Field of Search ............... 358/285, 289, 290, 310, 358/312, 313; 360/81, 83, 84, 87, 108; 346/108, 76 L; 369/97, 44, 46, 100, 109, 106, 110, 111, 112, 116, 118, 113, 120, 122; 350/6.1–6.9

[56] References Cited

U.S. PATENT DOCUMENTS

| | | | |
|---|---|---|---|
| 3,823,276 | 7/1974 | Maslowski et al. | 369/112 |
| 4,496,209 | 1/1985 | Itoh | 350/6.8 |
| 4,498,197 | 2/1985 | Chown | 455/619 |
| 4,514,055 | 4/1985 | Grant | 350/6.3 |
| 4,523,089 | 6/1985 | Maeda et al. | 250/205 |
| 4,525,024 | 6/1985 | Tatsuno et al. | 350/6.5 |
| 4,525,828 | 6/1985 | Higashiyama et al. | 369/112 |
| 4,527,173 | 7/1985 | Gupta et al. | 346/135.1 |
| 4,534,615 | 8/1985 | Iwasaki | 350/6.1 |
| 4,535,458 | 8/1985 | Inoue | 372/25 |
| 4,539,686 | 9/1985 | Bosch et al. | 372/26 |
| 4,539,687 | 9/1985 | Gordon | 372/43 |
| 4,544,228 | 10/1985 | Rando | 350/6.4 |
| 4,551,819 | 11/1985 | Michi et al. | 365/120 |
| 4,556,291 | 12/1985 | Chen | 350/377 |
| 4,661,941 | 4/1987 | Bell et al. | 369/111 |
| 4,669,070 | 5/1987 | Bell et al. | 369/111 |

FOREIGN PATENT DOCUMENTS 35568 8/1979 Japan .................... 369/111

Primary Examiner—Alan Faber
Attorney, Agent, or Firm—Oblon, Fisher, Spivak, McClelland & Maier

[57] ABSTRACT

A laser drum which can optically record and reproduce information on optical tapes. The laser drum comprises an upper drum which has two projection holes, rotates and is fitted with semiconductor lasers, a total reflective prism, stoppers, diffraction gratings, beam splitters, object lenses, condensing lenses and photodetectors.

6 Claims, 7 Drawing Sheets

LASER DRUM FOR USE IN RECORDING AND REPRODUCING INFORMATION ON OPTICAL TAPES

FIELD OF THE INVENTION

The present invention relates to a laser drum for use in optically recording and/or reproducing information on optical tapes and more particularly to a laser drum which can optically record and/or reproduce video or audio signals on optical tapes.

BACKGROUND OF THE INVENTION

Conventionally, various means to optically reproduce video or audio signals on video discs or compact discs have already been proposed, but such discs are unable to optically record a large quantity of information because of the limited recording space, even though they can record various information in a high density ($10^8$bits/cm$_2$). The recording density of magnetic tapes for use in video cassette recorder is too low (one hundredth to that of laser discs) to record a large quantity of information.

SUMMARY OF THE INVENTION

It is an object of the present invention to provide a laser drum which makes it possible to optically reproduce video or audio signals recorded on read-only-type optical tapes.

It is another object of the present invention to provide a laser drum for optically recording and reproducing video or audio signals on DRAW (direct read after wire)-type optical tapes.

In accordance with the present invention, a semiconductor laser (or a laser diode) is used in the laser drum and the advantages of high recording density of the laser discs and of wide recording space of the magnetic tape are realized. In fact, a magnetic tape with the surface area of 0.5×7,870 inches has the recording space of 40 times larger than that of a laser disc with the diameter of 30 cm (about 11.8 inches).

BRIEF DESCRIPTION OF THE DRAWINGS

For a better understanding of the present invention, reference is made to the following description which is to be read in conjunction with the following drawings wherein.

DETAILED DESCRIPTION OF THE PREFERRED EMBODIMENT

Figure 1:
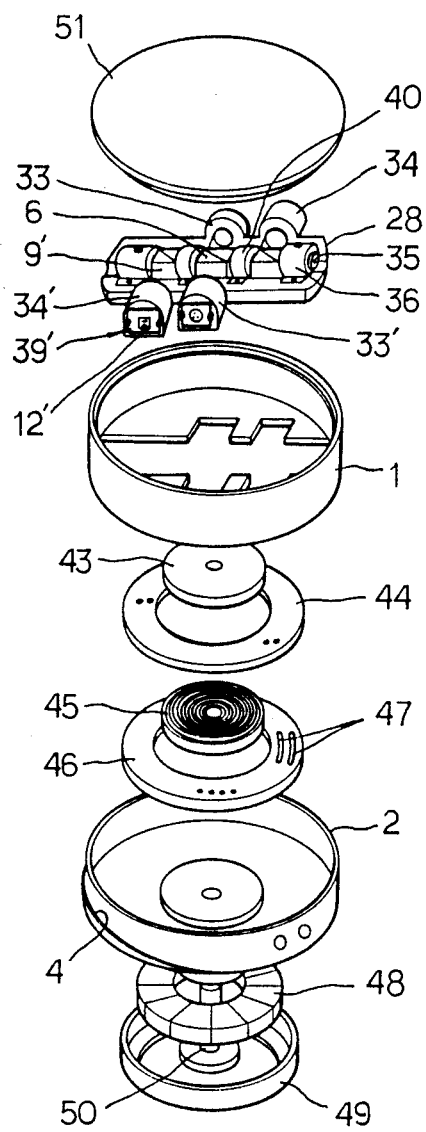
FIG. 1 is an exploded perspective view of a laser drum according to the present invention.
Figure 2A:
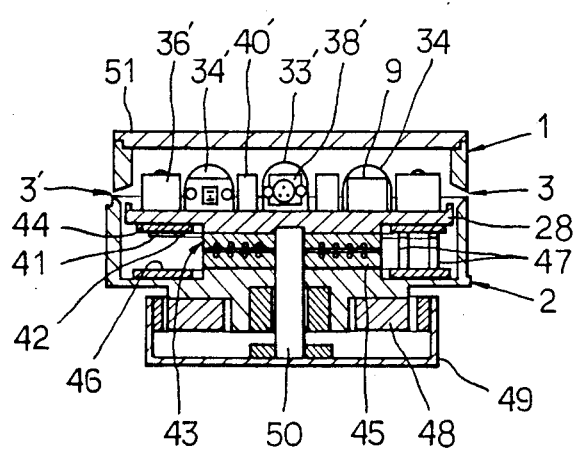
FIG. 2A is a partially cutaway elevational view of the laser drum of FIG. 1.
Figure 2B:
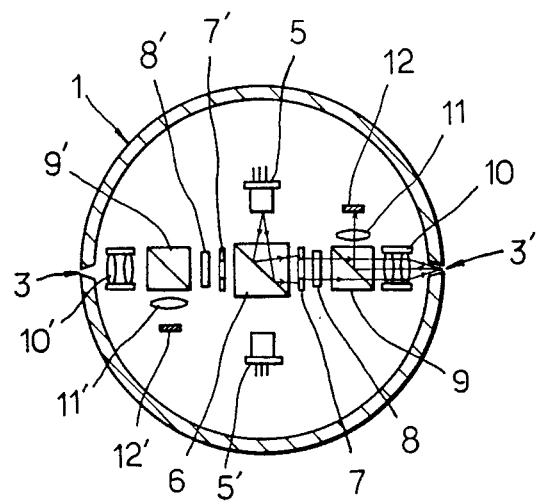
FIG. 2B is a partially cutaway plan view of the laser drum of FIG. 1.

A preferred embodiment of a laser drum according to the present invention is hereinbelow described in detail. In FIGS. 1, 2, 3 and 4, a fixing board 28 is fitted with semiconductor lasers 5, 5', a total reflective prism 6, stoppers 7, 7', diffraction gratings 8, 8', beam splitters 9, 9', object lenses 10, 10', condensing lenses 11, 11' and photodetectors 12, 12' and the fixing board 28 is installed in an upper drum 1 formed with two projection holes 3, 3' at the opposite sides of its lower circumferential edge.

Two semiconductor lasers 5, 5' are installed on the opposite side to one another at a certain distance and the total reflective prism 6 lies midway between the semiconductor lasers 5, 5'. On the left and right sides of the total reflective prism 6, stoppers 7, 7', diffraction gratings 8, 8', beam splitters 9, 9' and object lenses 10, 10' are installed in order to be kept at certain distances. The condensing lenses 11, 11' and photodetectors 12, 12' are set up by turns on the right of the beam splitters 9, 9' facing the diffraction gratings 8, 8' respectively. The upper drum 1 is combined with a lower drum 2 which has a slantig guide line 4 projected on its surface.

Figure 4:
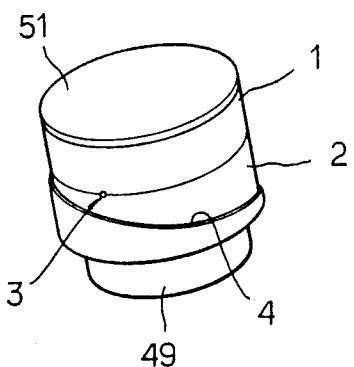
FIG. 4 shows a perspective view of the laser drum by this invention.

In FIG. 4, the numeral 51 represents the cover of the upper drum 1.

The upper and lower drums 1, 2 are fixed to be inclined at a certain angle to the direction of an optical tape's travelling course for helical scanning of tracks on the optical tape as show in FIG. 4.

Figure 5:
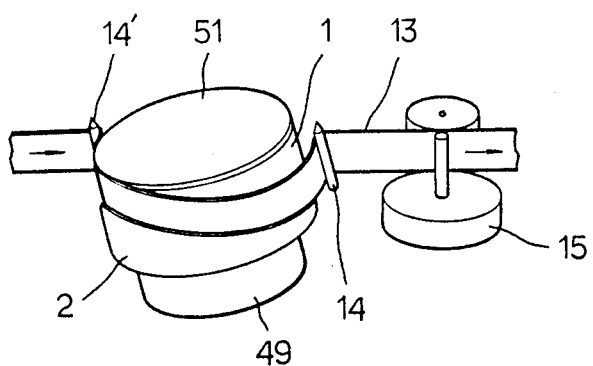
FIG. 5 shows how the laser drum of this invention is used.

The optical tape 13 comes in contact closely with surfaces of the upper and lower drums 1, 2 by means of guide pins 14, 14'. As can be seen from FIG. 5, when the upper drum 1 rotates on the motor shaft 50, the optical tape slides on the surfaces of the drum 1, 2 with its lower edge osculating to the guide line 4 of the lower drum 2.

When the drums 1, 2 are operated as described in the above condition, laser beams, being radiated from the semiconductor lasers 5, 5', are reflected to the directions of the stoppers 7, 7' respectively by the total reflective prism 6. Though these laser beams have an elliptical section, they are made to have a circular section by passing through the stoppers 7, 7'. The circular laser beams which have passed therethough are applied to the diffraction gratings 8, 8' and diffracted into three kinds of beams, e.g. zero-order, (+)first-order and (−)first-order beams. Then, the diffracted laser beams pass through the beam splitters 9, 9' and object lenses 10, 10' successively, reaching the surface of the optical tape 13 respectively. The laser beams are focused on the surface of the optical tape 13 by the object lenses 10, 10' in order to record and/or reproduce the information in the optical tape 13.

Figure 8:
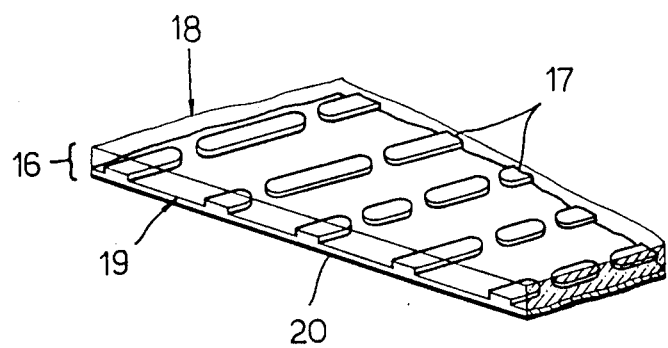
FIG. 8 is a partially enlarged perspective view of a read-only-type optical tape.
Figure 10:
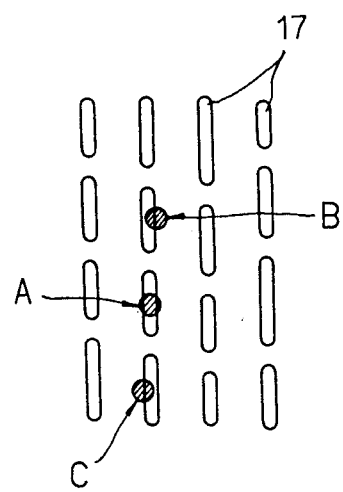
FIG. 10 shows the laser beams incident on the surface of the DRAW-type optical tape.

FIG. 8 illustrates the structure of a read-only-type optical tape 16 in which the video and audio signals are recognized by existence and/or nonexistence of the pits 17 and the length of the pits 17. A succession of spaced pits 17 coated with a transparent material 18 as a protective layer is formed on a reflective layer 19. The height of the pits 17 is $\frac{1}{4}\lambda'$, wherein $\lambda'$ is the wavelength which the laser drum has in the transparent material 18. Thus, a laser beam focused upon the pit 17 and the reflected laser beam from the pit 17 come to have a phase difference of almost $\frac{1}{2}\lambda'$ (180°) and become extinct owing to the interference with each other. So, as shown in FIG. 10, each zero-order beam diffracted by the gratings 8, 8' is incident upon the optical tape and focused as A, so that the laser beam may become extinct where there is a pit on the surface of the optical tape 16 while 100% of the laser beam is reflected where there is not a pit 17. Also, the (+)first-order beams are focused as B and C respectively as shown in FIG. 10. So, when the pit 17 leans to the right, (+)first-order beam incident upon B becomes extinct and (−)first-order beam incident upon C is reflected by 100%. The numeral 20 is a substrate of the tape 16.

When the pit 17 leans to the left on the contrary, (−)first-order beam becomes extinct and (+)first-order beam is reflected by 100%.

The zero-order and (±)first-order beams reflected from the recording surface of the read-only-type optical tape 16 are respectively returned to the beam splitters 9, 9' via the object lenses 10. 10'. Then, the reflected beams returned by the beam splitters 9. 9' pass through the condensing lenses 11, 11' and reach the photodetectors 12, 12', which are set up at the focal distances of the condensing lenses 11, 11'.

Figure 6:
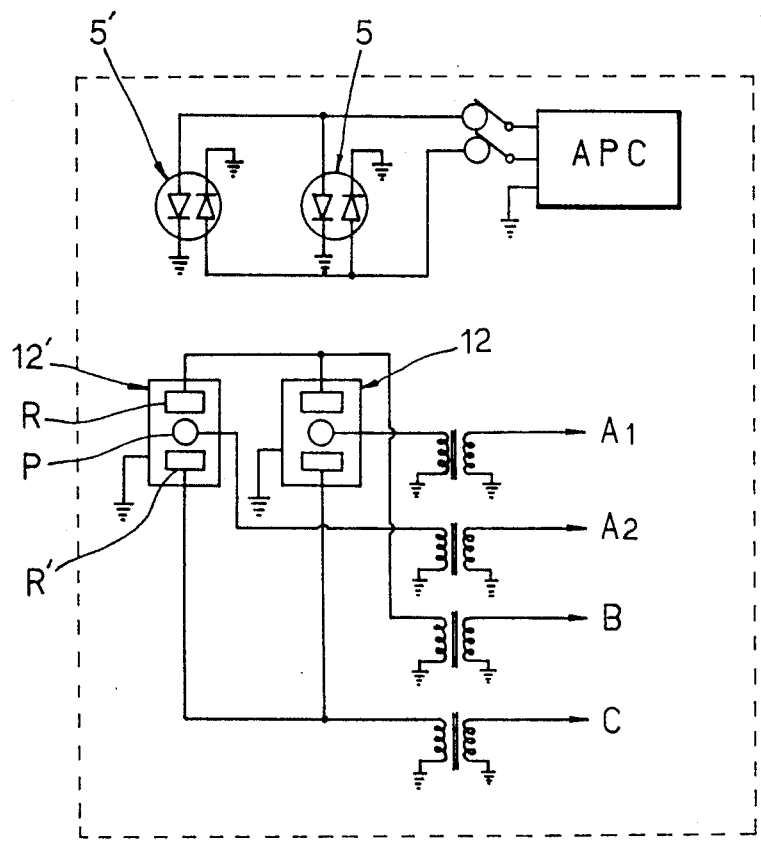
FIG. 6 is a schematic diagram of a circuit to control operation of the laser drum of this invention.

FIG. 6 shows the photodetecors 12, 12' which are represented by three separate photoelectric cells R, P, R'. The cell P can detect the change of the length of the pits 17 and the tracking signals for use in controlling the speed of the optical tape 16 can be obtained by the cells R, R'.

Figure 9:
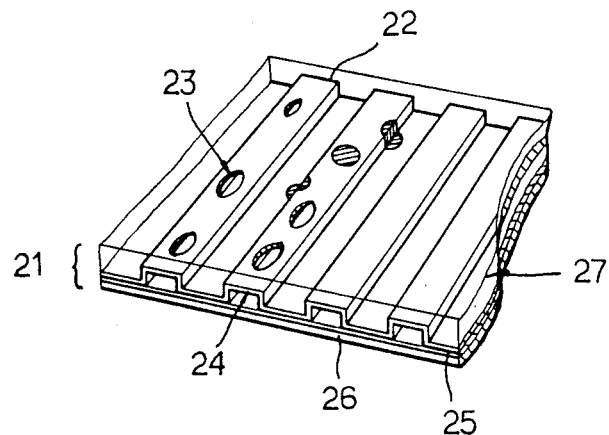
FIG. 9 is a partially enlarged perspective view of a DRAW-type optical tape.

FIG. 9 illustrates the structure of the DRAW-type optical tape 21 used for both recording and reproduction. The tracking signals recorded on the DRAW-type optical tape 21 can be read in the same way as the read-only-type optical tape 16.

In optical recording operations, it is usual to focus the laser beam from the semiconductor lasers 5, 5' upon the surface of grooves 22, on which the transparent material 27 forming a protective layer is coated with sufficient thickness, to cause ablation of a recording material 24 (See the numeral 23 in FIG. 9). In optical reproducing operations, the laser beam is focused continuously upon the grooves 22 and the recorded signals can be reproduced by detecting the change of reflectance of the laser beam from the ablated regions of the grooves 22.

The numerals 25, 26 are an adhesive layer and a substrate respectively.

The laser drums 1, 2, which operate as described hereinabove, require high precision processing of micro-metric unit and the optical elements also require precise arrangement.

Figure 3:
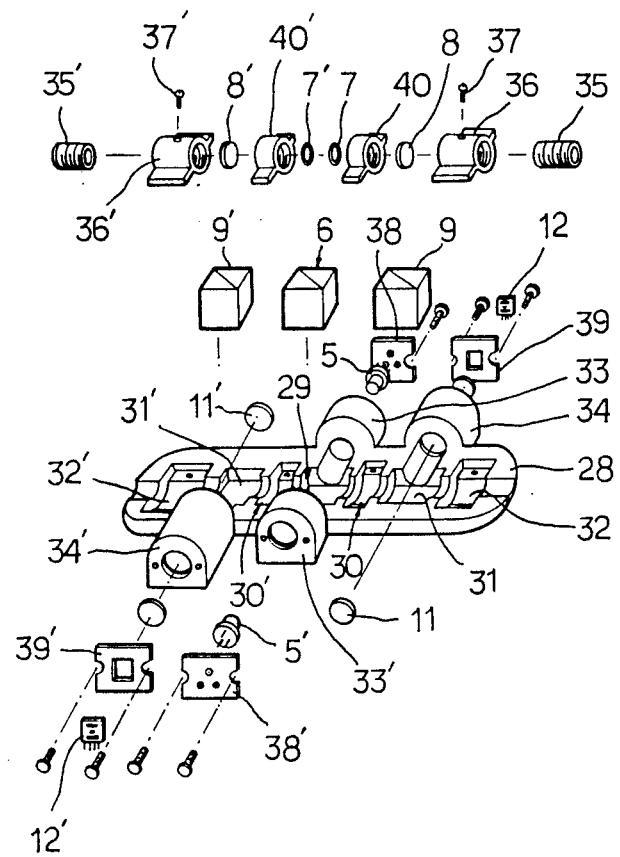
FIG. 3 illustrates a partial exploded view of the laser drum of FIG. 1.

As shown in FIG. 3, a square groove 29 for fixing the total reflective prism 6 is formed in the center of the fixing board 28. On the left and right sides thereof, grooves 30, 30' for the stoppers 7, 7' and deffraction gratings 8, 8', square grooves 31, 31' for the beam splitters 9, 9' and grooves 32, 32' for the object lenses 10, 10' are formed respectively. In the opposite sides of the center of the fixing board 28, sleeves 33, 33' for fixing the semiconductor lasers 5, 5' are installed and on the outer sides thereof, sleeves 34, 34' for fixing photodetectors 12, 12' are installed opposingly. On the external circumferences of lens casings 35, 35' and the internal circumferences of the holders 36, 36' of said lens casings 35, 35', micro-spirals are formed respectively for adjusting the focuses of the object lenses 10, 10' on the recording surface of the optical tape. After the adjustment of the focuses of the lenses 10, 10', the lens casings 35, 35' are fixed by tightening up screws 37, 37'.

Fixing plates 38, 38' and 39, 39' for the semiconductor lasers 5, 5' and the photodetectors 12, 12' are respectively fixed to laser casings 33, 33' and photodetector casings 34, 34' with screws shown in FIG. 3. The left and right sides of the fixing plates 38, 38' and 39, 39' are formed with two grooves so as to adjust their fixing positions.

The numerals 40, 40' are jigs for fixing the stoppers 7, 7' and the diffraction gratings 8, 8'.

FIG. 6 shows the control circuit of the laser drum, which transmits electric signals representative of the recorded information and receives control signals of the semiconductor lasers 5, 5' from an automatic power control circuit APC in FIG. 6 or a laser driving circuit (not illustrated).

As described hitherto, the laser drum according to the present invention has two parts; One is installed within the upper drum 1 and rotates therewith and the other is fixed in the lower drum 2 which does not move. An upper transformer 43 provided with four coils on its bottom and an upper rounded-board 44 provided with two looped metal bands 41, 42 (See FIG. 2B) on its bottom are installed within the upper drum 1. The lower transformer 45 having four coils on its top and a lower rounded-board 46 having two brushes 47 being in contact with the looped metal bands 41, 42 of the upper rounded-board 44 are fixed in the lower drum 2. The motor shaft 50 is connected with the fixing board 28 installed in the upper drum 1 and the upper drum 1 rotates by the torque of a rotor 49. The numeral 48 represents a motor coil.

Figure 7:
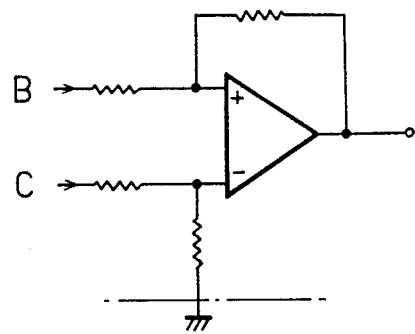
FIG. 7 is a schematic diagram of a tracking servo circuit for this invention.

The laser power of the semiconductor lasers 5, 5' is controlled by an automatic power control circuit APC in FIG. 6 in reproducing operations and is controlled by a laser driving circuit (not illustrated) in recording operations. The output signals of these circuits are transmitted to the semiconductor lasers 5, 5' via the brushes 47 and the looped metal bands 41, 42 of the rounded-boards 44, 46. The output signals of the photo detectors 12, 12' are transmitted to the upper transformer 43 and main video and audio signals $A_1$, $A_2$ and tracking signals B, C are induced by four induction coils of the lower transformer 45. Then, the tracking signals B, C are transmitted to a tracking servo circuit in FIG. 7, which controls the operation of a servo motor 15 in FIG. 5.

As noted hereinabove, the laser drum according to the invention has two projection holes 3, 3' formed on opposite sides to each other on the upper drum 1. For half a turn of the upper drum 1, the optical tape 13 travels the distance of one track-width on the optical tape 13 and the laser beams through the projection holes 3, 3' can precisely scan the tracks of the optical tape 13 successively.

The laser drum according to the invention has the advantage of recording a great more information on the optical tape compared with the conventional magnetic recording type head drum or the compact disc. Further, the laser drum has the advantage of making less noises than the magnetic recording type head drum. Furthermore, it can have a simple structure because it is not influenced by the mechanical vibrations which can not be avoided when the compact disc is adopted.

While the invention has been described with reference to specific embodiments, it will be understood by those skilled in the art that various changes may be made and equivalents may be substituted for elements thereof without departing from the spirit and scope of the invention. Also, various modifications may be made to adapt to a particular situation without departing from the essential characteristics of the invention.

What is claimed is:

1. A laser drum for use in recording and reproducing information on an optical tape, comprising:
   an upper drum, which has two projection holes at the opposite sides of its lower circumferential edge, said upper drum supporting a fixing board on which is mounted first and second semiconductor lasers, a total reflective prism, first and second stoppers, first and second diffraction gratings, first and second beam splitters, first and second pair of object lenses, first and second condensing lenses, first and second photodetectors, an upper transformer having induction coils on its bottom side, and an upper rounded-board having looped metal bands on its bottom side; and
   a lower drum which has a slanting guide line projected on its surface and holds a lower transformer having induction coils on its top and a lower rounded-board having brushes which make contact with said looped metal bands;
   the first semiconductor laser radiating a first laser beam which is reflected by said total reflective prism to the first stopper, and the second semiconductor laser radiating a second laser beam which is reflected by said total reflective prism to the second stopper, the first laser beam passing through the first stopper which causes the first laser beam to have a circular section, and the second laser beam passing through the second stopper which causes the laser second beam second to have a circular section;
   the first laser beam proceeding through the first stopper to the first diffraction grating which diffracts the first laser beam into zero-order and (±) first-order beams, and the second laser beam proceeding through the second stopper to the second diffraction grating which diffracts the second laser beam into zero-order and (±) first-order beams;
   the order beams originating from the first diffraction grating proceeding through the first beam splitter and proceed through the first pair of object lenses and thereby being focused through the first projection hole and upon said optical tape, and the order beams originating from the second diffraction grating proceeding through the second beam splitter and proceed through the second pair of object lenses and thereby being focused through the second projection hole and upon said optical tape;
   said optical tape reflecting the order beams, which originate from the first diffraction grating back through the first projection hole, through the first pair of object lenses and to the first beam splitter, and said optical tape reflecting the order beams which originate from the second diffraction grating back through the second projection hole, through the second pair of object lenses and to the second beam splitter;
   the first beam splitter directing the order beams, which were reflected back through the first pair of object lenses, through the first condensing lens to the first photodetector, the first photodetector detecting the order beams, and the second beam splitter directing the order beams, which were reflected back through the second pair of object lenses, through the second condensing lens to the second photodetector, the second photodetector detecting the order beams;
   the first photodetector producing a plurality of output signals which are transmitted to said upper transformer and to said lower transformer, and the second photodetector producing a plurality of output signals which are transmitted to said upper transformer and to said lower transformer; and,
   a control means to supply control signals to said first and second semiconductor lasers, said control signals of said control means being transmitted to said semiconductor lasers via said upper rounded-board and said lower rounded-board.

2. A laser drum according to claim 1, wherein said control means comprises:
   an automatic power control circuit during reproducing operations and a laser driving circuit during recording operations.

3. A laser drum according to claim 1, comprising:
   first lens casings and holders which adjust distances between the first pair of object lenses and the first projection hole; and
   second lens casings and holders which adjust distances between the second pair of object lenses and the second projection hole.

4. A laser drum according to claim 3, wherein:
   said first and second lens casings and holders having spiral grooves separated by distances on the order of several microns, said spiral grooves comprising the external circumferences of said lens casings and the internal circumferences of said holders in order that the focus of said first and second pair object lenses may be adjusted.

5. A laser drum according to claim 1, wherein:
   each beam splitter comprises a polarizing beam splitter; and
   $\frac{1}{4}\lambda$ plates are installed between each polarizing beam splitter and each pair of object lenses.

6. A laser drum according to claim 1, wherein:
   each photodetector has three photoelectric cells, and tracking signals for said optical tape are obtained by two of said photoelectric cells.

* * * * *